United States Patent
Ritter et al.

(10) Patent No.: US 6,577,615 B1
(45) Date of Patent: Jun. 10, 2003

(54) METHOD, MOBILE STATION AND BASE STATION FOR FREQUENCY SYNCHRONIZATION OF A MOBILE STATION IN A RADIO COMMUNICATIONS SYSTEM

(75) Inventors: Gerhard Ritter, Thaining (DE); Anja Klein, München (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/446,197

(22) PCT Filed: Jun. 17, 1998

(86) PCT No.: PCT/DE98/01653
§ 371 (c)(1),
(2), (4) Date: Dec. 16, 1999

(87) PCT Pub. No.: WO98/58464
PCT Pub. Date: Dec. 23, 1998

(30) Foreign Application Priority Data

Jun. 17, 1997 (DE) .......................................... 197 25 570

(51) Int. Cl.⁷ .............................................. H04B 15/00
(52) U.S. Cl. ........................ 370/342; 370/514; 455/502
(58) Field of Search ............................. 455/13.2, 502,
455/342, 324; 370/350, 503, 507, 509,
510, 512, 514; 375/354, 355, 362

(56) References Cited

U.S. PATENT DOCUMENTS 5,343,498 A * 8/1994 Toy et al. .................... 370/337
5,359,624 A * 10/1994 Lee et al. .................... 370/342
5,390,216 A * 2/1995 Bilitza et al. ................ 370/328
5,933,465 A * 8/1999 Ozaki .......................... 375/316
6,256,336 B1 * 7/2001 Rademacher et al. ........ 370/342
6,272,121 B1 * 8/2001 Smith et al. ................. 370/277

FOREIGN PATENT DOCUMENTS

WO          WO 96/29791          9/1996

* cited by examiner

Primary Examiner—William Trost
Assistant Examiner—Simon Nguyen
(74) Attorney, Agent, or Firm—Bell, Boyd & Lloyd, LLC

(57) ABSTRACT

A TDMA/CDMA radio communications system provides frequency channels which are formed both by time slots and by broadband frequency ranges, and in which information from a plurality of connections can be simultaneously transmitted between mobile stations and a base station wherein it is possible to distinguish the information from different connections in accordance with a connection-specific fine structure. Frequency channels are repeatedly provided for frequency synchronization of the mobile stations in the downward direction in which a symbol sequence is transmitted. From received signals, the mobile station to be synchronized determines estimated values for the symbol sequence and compares these estimated values with a reference sequence. It is thereby possible to calculate a phase drift in the estimated values with reference to the reference sequence wherein a frequency offset, which is used for frequency synchronization, is determined from the phase drift.

10 Claims, 4 Drawing Sheets (prior art)

METHOD, MOBILE STATION AND BASE STATION FOR FREQUENCY SYNCHRONIZATION OF A MOBILE STATION IN A RADIO COMMUNICATIONS SYSTEM

The present invention relates generally to a method for frequency synchronization of a mobile station in a radio communications systems (in particular, a TDMA/CDMA radio communications system), and, more specifically to a mobile station and to a base station which can carry out such method.

DESCRIPTION OF THE PRIOR ART

The design of digital radio communications systems is shown in J. Oudelaar, "Evolution towards UMTS", PIMRC 94, 5th IEEE International Symp. on Personal, Indoor and Mobile Radio Communications, The Hague, NL, Sep. 18–22 1994, pages 852–856, and M. Lenti, H. Hageman, "Paging in UMTS", RACE Mobile Telecommunications Workshop, Vol. 1, Amsterdam, NL, May 17–19 1994, pages 405–410.

The presently known mobile radio system GSM (Global System for Mobile Communications) is a radio communications system with a TDMA component for subscriber separation (time division multiple access). User information from the subscriber connections is transmitted in time slots in accordance with a frame structure. The transmission is performed in blocks. Furthermore, frequency channels (FCCH frequency correction channels) matched to the timing pattern of the frame structure and serving the purpose of frequency synchronization for the mobile stations are known in the downward direction from the GSM mobile radio systems. In this frequency channel, a mobile station can evaluate a sinusoidal carrier for the purpose of self-synchronization. Frequency synchronization by means of a sinusoidal carrier is disclosed, for example, in WO 91 10305 A.

Time synchronization of time slots in a TDMA radio communications system is disclosed in EP 0 318 684. D1 discloses a method for time synchronization of a mobile station. The radio transmission channel has a signal delay between the base station and mobile station which is proportional to the distance between the mobile station and the base station. In addition, the signal delay can vary strongly in time because of reflections. The signals received by the mobile station are delayed temporally with different severity by the signal delay. This delaying of the signal between the transmitted signal and the received signal is denoted as phase error. The compensation of this delaying of the signal is the subject matter of the method for time synchronization. In such case, the delaying of the signal is constant within one TDMA time slot.

DE 195 49 148.3 discloses a mobile communications system which uses a TDMA/CDMA subscriber separation (CDMA code division multiple access), and applies at the receiving end a JD method (joint detection) in order to undertaken with knowledge of sequence spread codes of a plurality of subscribers to, improved detection of the transmitted user information. Information from a plurality of user data connections which can be distinguished by their spread code are transmitted simultaneously in one frequency channel (TCH traffic channel). However, the division of specific frequency channels for synchronization purposes results in a large loss in capacity in comparison with the GSM system since the frequency range used for a frequency channel is a more broadband one.

It is an object of the present invention, therefore, to provide a method and devices which permit frequency synchronization in conjunction with low consumption of radio resources in a radio communications system.

SUMMARY OF THE INVENTION

A radio communications system provides frequency channels which are formed by time slots and by broadband frequency ranges, and in which information from several connections is transmitted simultaneously between mobile stations and a base station; it being possible to distinguish the information from different connections in accordance with a connection-specific fine structure. The different connections also can be formed by a plurality of codes which are assigned to a single mobile station.

According to the present invention, frequency channels in which a symbol sequence is transmitted are temporally repeatedly provided for frequency synchronization for the mobile stations in the downward direction. From received signals, the mobile station to be synchronized determines estimated values for the symbol sequence and compares them with a reference sequence. Consequently, a phase drift in the estimated values with reference to the reference sequence can be calculated. A frequency offset to which is used for frequency synchronization is determined from the phase drift.

By virtue of the fact that a phase drift can be calculated in accordance with the comparison, the possibility arises of simply determining the frequency offset of the mobile station to be synchronized with reference to the carrier of the frequency channel. A sufficiently large and appropriately distributed number of samples is sufficient for the comparison. It is thereby possible for the frequency synchronization to be combined with other measures for synchronizing the mobile station so that the use of radio resources remains low.

Advantageously, the symbol sequence is transmitted in addition to information from further connections. This also means that the radio resources of the air interface between the base station and mobile stations can be better used. Because information can be distinguished in accordance with an impressed fine structure, a time slot is not blocked solely by the synchronization. Rather, such time slot can be used multifariously. The further connections are, in this case, user data connections or signaling connections.

In an embodiment of the present invention, the symbol sequence is transmitted in such a way that at least two estimated values are obtained at a temporal spacing sufficiently large for the phase drift calculation. It is, therefore, not necessary for the symbol sequence to be a continuous sequence. There can be individual symbols or groups of symbols within further known or unknown symbols to be transmitted. The symbols can last over the time period of a time slot, or they can be transmitted in addition to training sequences and/or symbols for other tuning purposes.

The symbol sequence is advantageously spread with the aid of an individual spread code, it being possible for the information on the presence of a symbol sequence to be included in the spread code for time synchronization. The symbol sequence also can be interpreted as a sequence of chips which generate a bandwidth which fills up the frequency range. An additional outlay on processing at the receiver is eliminated by virtue of the fact that the message block with the data for time synchronization can be processed together with the remaining message blocks by despreading.

In accordance with a further embodiment of the present invention, the phase drift is calculated as a proportionality factor in accordance with the method of least error squares from the comparison of the estimated values with the reference sequence. A linear relationship is presupposed between the estimated values and reference sequence; that is, an approximately constant frequency offset. This obtains in the case of the high accuracies of the frequency normal in the mobile station.

It is advantageous to use at least parts of the symbol sequence both for the time synchronization and for the frequency synchronization. Thus, it is possible with the aid of a symbol sequence, for example by correlation, to produce the temporal reference of the transmission within a time slot and, in addition, the frequency reference by determining the phase drift. Only a low network capacity need therefore be set aside for synchronization.

DETAILED DESCRIPTION OF THE PREFERRED EMBODIMENTS

Figure 1:
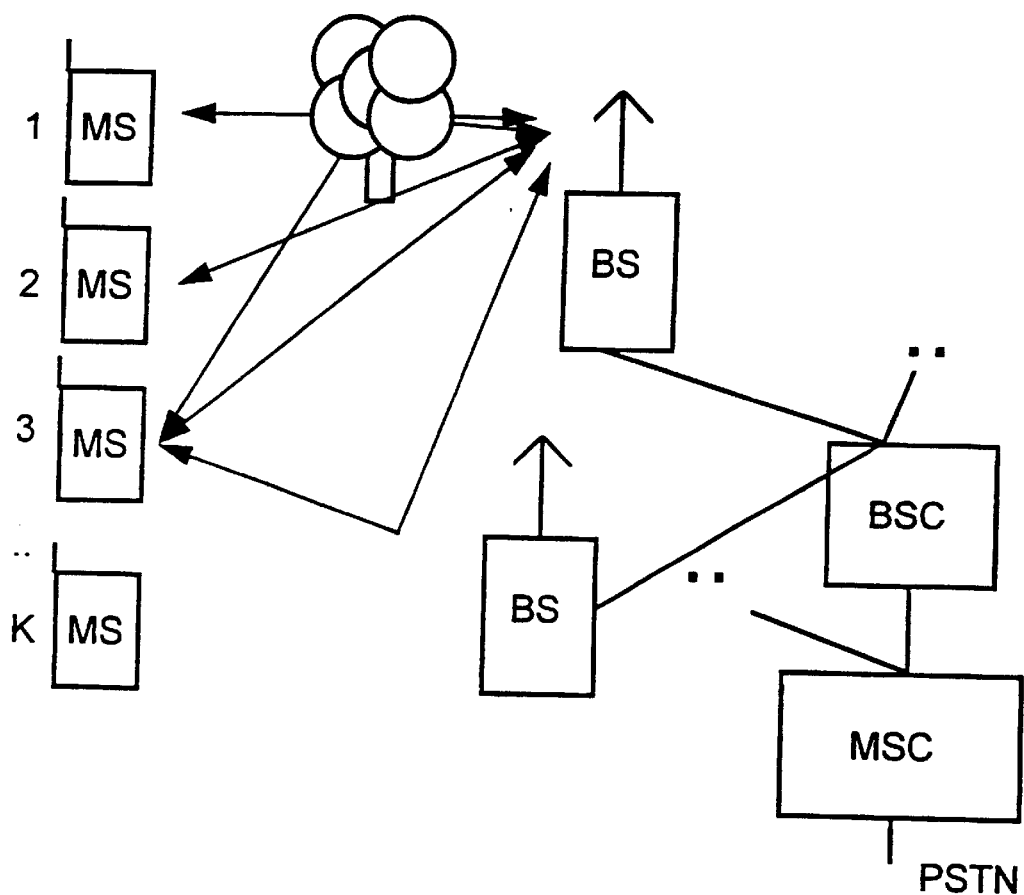
FIG. 1 shows a schematic block diagram of a mobile radio network.

The radio communications system represented in FIG. 1 corresponds in structure to a known GSM mobile radio network which includes a multiplicity of mobile switching centers MSC which are networked with one another and which provide the access to a landline network PSTN. Furthermore, these mobile switching centers MSC are respectively connected to at least one base station controller BSC. Each base station controller BSC, in turn, permits connection to at least one base station BS. Such a base station BS is a radio station which can establish a message connection to mobile stations MS via an air interface.

By way of example, FIG. 1 represents three connections for transmitting both user information and signaling information between three mobile stations MS and a base station BS. An operating and maintenance center OMC implements control functions and maintenance functions for the mobile radio network, or for parts thereof. The functionality of this structure can be transferred to other radio communications systems in which the present invention can be used.

Figure 2:
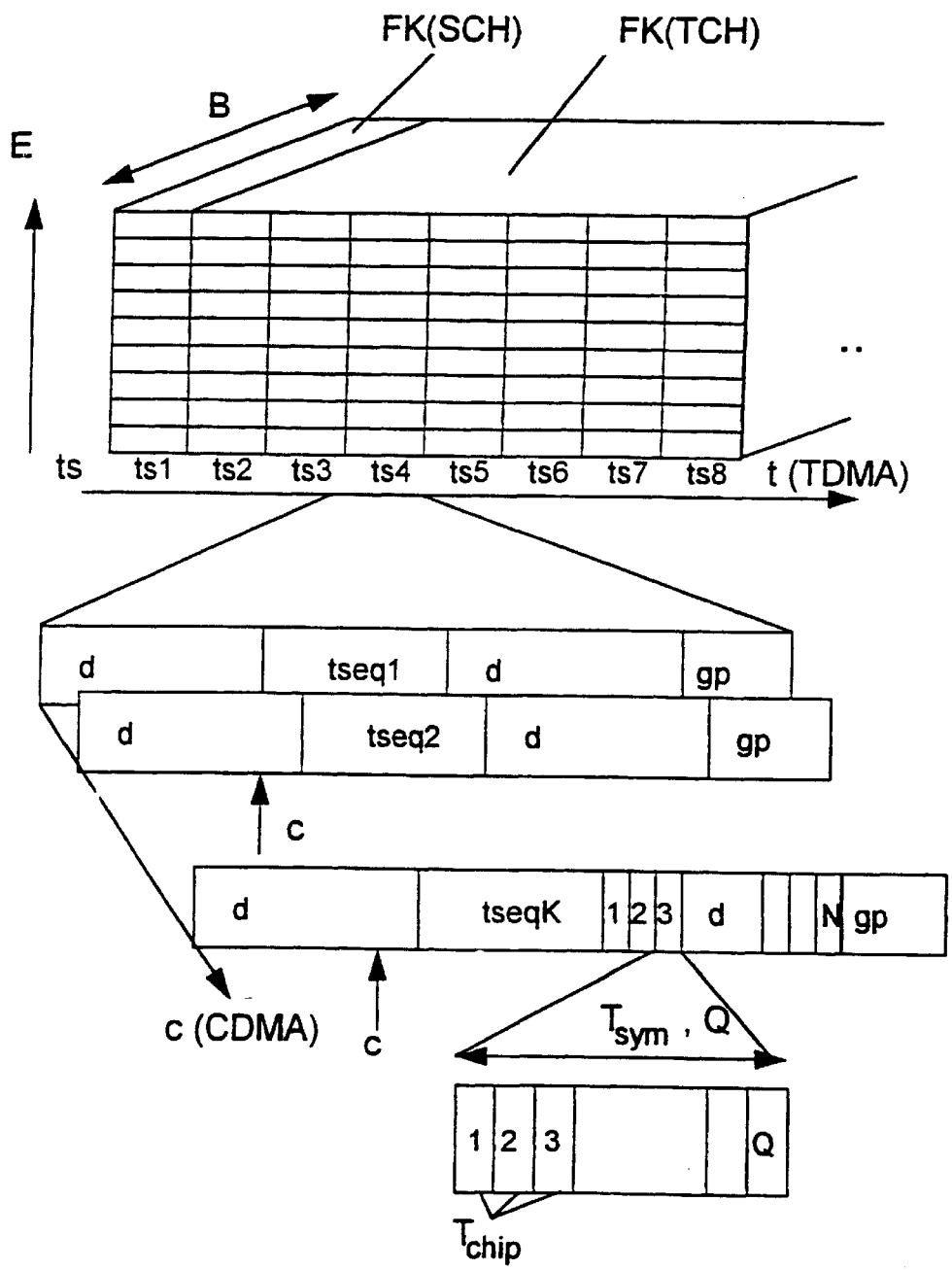
FIG. 2 shows a schematic representation of the frame structure of a radio transmission in the mobile radio network.

The frame structure of the radio transmission can be seen in FIG. 2. Partitioning of a broadband frequency range (for example, the bandwidth B=1.6 MHz) into a plurality of time slots ts (for example, 8 time slots ts1 to ts8) is provided in accordance with a TDMA component. Each time slot ts within the frequency range B forms a frequency channel FK. Within the frequency channels TCH, which alone are provided for transmitting user data, information from a plurality of connections is transmitted in message blocks.

These message blocks for transmitting user data comprise sections with data d in which sections with training sequences tseq1 to tseqK known at the receiving end are embedded. The data d is spread in a connection-specific fashion with a fine structure (a subscriber code c) with the result that at the receiving end K connections can be separated by these CDMA components, for example.

The spreading of individual symbols of the data d has the effect that Q chips of duration $T_{chip}$ are transmitted within the symbol duration $T_{sym}$. The Q chips in this case form the connection-specific subscriber code c. Furthermore, a protection time gp for compensating different signal delays of the connections is provided within the time slot ts.

Within a broadband frequency range B, the sequential time slots ts are subdivided in accordance with a frame structure. Thus, eight time slots ts are combined to form a frame wherein, for example, one time slot of the frame forms a frequency channel TCH for user data transmission and is repeatedly used by a group of connections. A frequency channel FCCH for frequency synchronization of the mobile stations MS is not inserted in every frame, but rather at a prescribed instant within a multiframe. The spacings between the frequency channels FCCH for frequency synchronization determine the capacity made available therefor by the mobile radio network.

Figure 3:
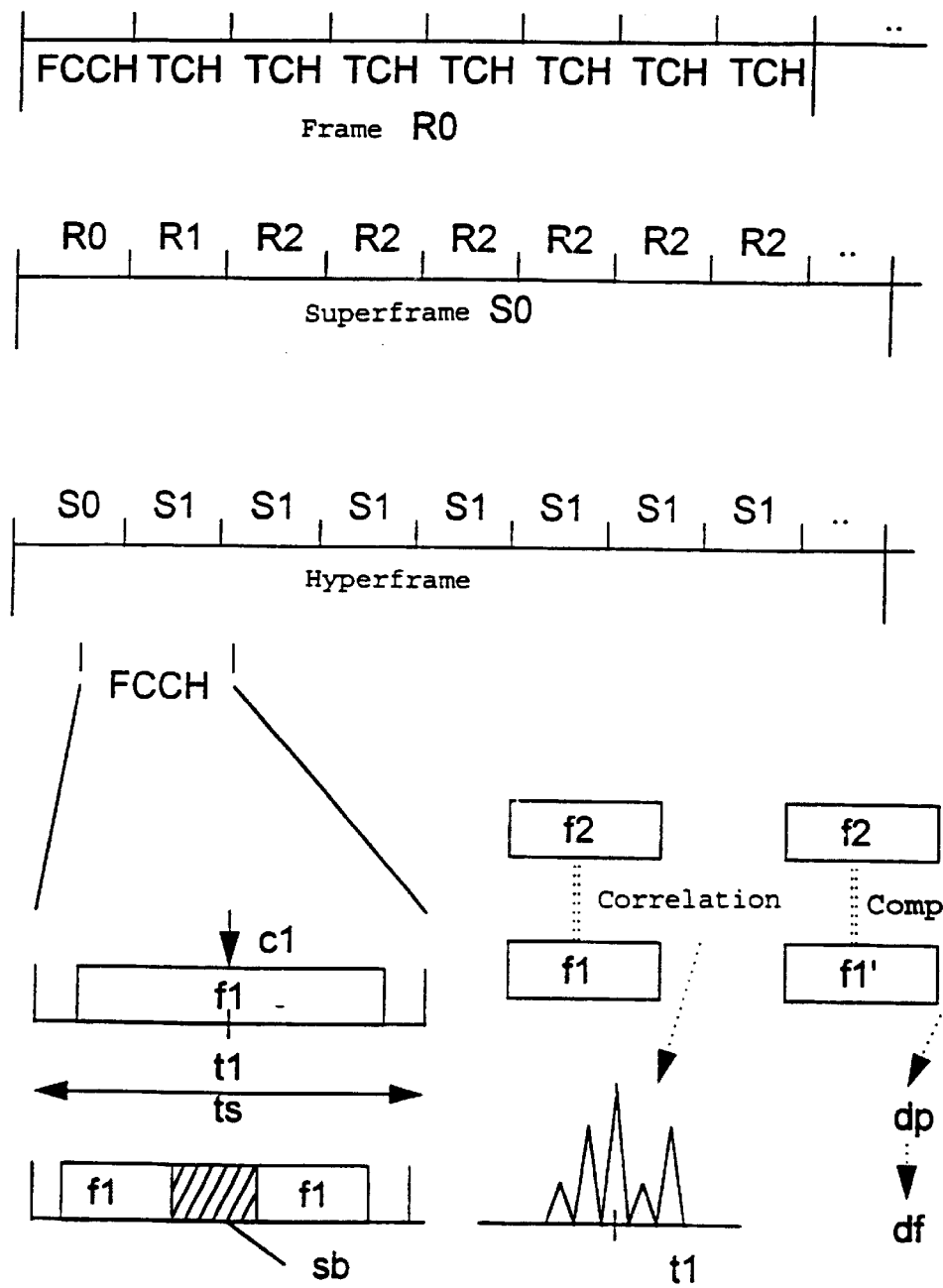
FIG. 3 shows a schematic representation of the structure of a frequency channel for time synchronization.

The structure of a frequency channel FCCH for frequency synchronization is shown with the aid of FIG. 3. The broadband frequency range B in the frequency band of an organization channel of the corresponding cell of the mobile radio network is part of a frame R0. Such frame R0 includes a frequency channel FCCH for frequency synchronization (in which, however, further signaling and user data connections are also handled) and, in the following time slots, exclusive frequency channels TCH for user data transmission or signaling transmission.

This frame R0 is, in turn, part of a superframe S0 which, in addition to the frame R0, includes both a frame R1 having frequency channels FK with further cell-related information and a frame R2 with user data. A hyperframe includes, in turn, a plurality of superframes S0, S1, of which at least one contains a frequency channel FCCH for frequency synchronization.

Transmitted in the downward direction in a time slot ts of the frequency channel FCCH for frequency synchronization is a symbol sequence f1 which is known in the mobile stations MS as a reference sequence. The symbol sequence f1 is spread with the aid of an individual code c1.

An alternative embodiment for the symbol sequence f1 provides that parts of the symbol sequence f1 are used as a synchronization block sb for time synchronization. This synchronization block sb is arranged in the middle of the time slot ts. The base station BS radiates the symbol sequence f1 with a transmitter power which is matched for the purpose of power control to the received power of the remaining connections.

Figure 4:
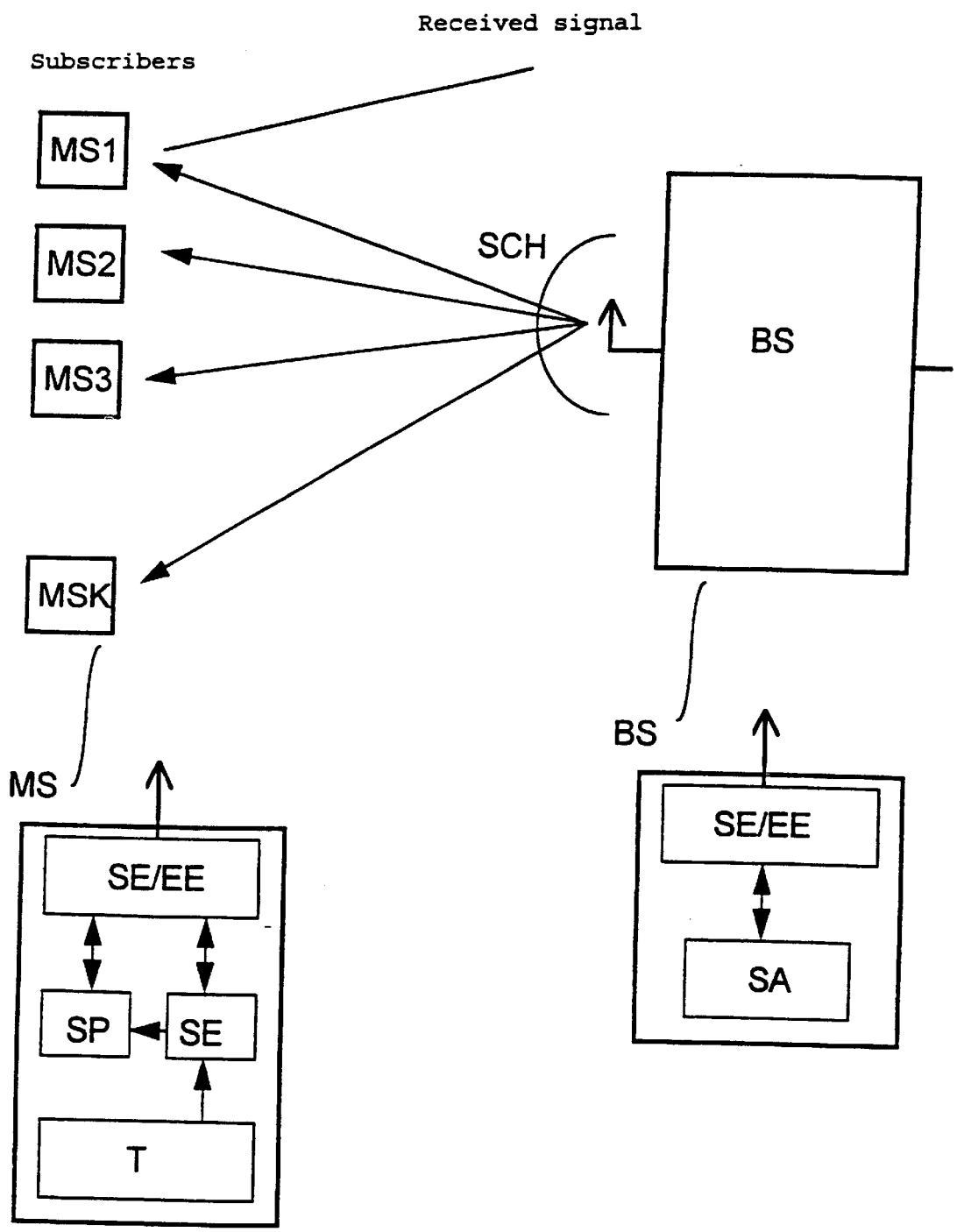
FIG. 4 shows block diagrams of mobile stations and a base station with radio transmission in a downward direction.

At the receiving end, an evaluation of the information transmitted in the downward direction is carried out for frequency synchronization. FIG. 4 shows the radio transmission in the downward direction from the base station BS to mobile stations MS1 to MSK. The mobile stations MS firstly determine one or more frequency ranges B with a sufficiently high or maximum received power. These are, in general, the frequency ranges B of the nearest base station BS in whose cell the mobile station MS is instantaneously located.

Mobile stations MS1 to MSK evaluate received signals in these frequency ranges B and carry out continuous correlation of the values of the respective received signals with the reference sequence f2. Given a sufficiently large correlation, the specific instant t1 of the arrival of the symbol sequence f1 is selected as reference point for time synchronization and an internal time reference of the mobile station MS is tuned.

Estimated values f1' are simultaneously determined for the symbol sequence f1 from the received signals.

Thereupon, a system of equations is set up which compares the estimated values f1' with the values of the reference sequence f2 which corresponds to the symbol sequence f1. A proportionality factor which represents a phase drift dp in the estimated values f1' with reference to the reference sequence f2 is determined by a calculation with the aid of the method of least error squares, or of another method of solution.

A frequency offset df is derived from the phase drift dp in accordance with the relationship:

$$dp = e^{j2\pi df \cdot t},$$

t representing time.

This frequency offset df of the internal frequency, which is normal relative to the carrier frequency of the frequency range B of the frequency channel FCCH for frequency synchronization, is applied to the internal frequency normal to the correct sign. The frequency synchronization is thereby carried out.

The base station BS includes a transceiver SE/EE which subjects the transmitted signals which are to be emitted to digital-to-analog conversion, converts from the baseband into the frequency range B of the emission, and modulates and amplifies the transmitted signals. A signal generating device SA has previously assembled the transmitted signals, for example the symbol sequence f1, and assigned them to the corresponding frequency channels FCCH, TCH.

The mobile station MS contains an operating panel T, a signal processing device SP, a control device SE and a transceiver SE/EE. On the operating panel T, the subscriber can make inputs, including an input for activating the mobile station MS, which thereupon must first carry out synchronization with the mobile radio network surrounding it.

The control device SE then receives this request and causes the signal processing device SP to evaluate signals received via the transceiver SE/EE such that, as already described, the appropriate frequency range B is selected and correlation is carried out until the symbol sequence f1 is successfully found. The time and frequency synchronization described is subsequently carried out.

For the purpose of signal processing, the received signals are converted into symbols with a discrete store of values; for example, digitized. This signal processing device SP, which as a digital signal processor contains a JD processor for detecting both the user information and the signaling information using the JD-CMDA method (joint detection), also evaluates the symbol sequence f1. Although the present invention has been described with reference to specific embodiments, those of skill in the art will recognize that changes may be made thereto without departing from the spirit and scope of the invention as set forth in the hereafter appended claims.

We claim:

1. A method for frequency synchronization of a mobile station of a radio communications system, the method comprising the steps of:
   providing frequency channels in the radio communications system which are formed both by time slots and by broadband frequency ranges wherein information from one or more connections is transmitted simultaneously in the frequency channels between mobile stations and base stations, and wherein the information from different connections is distinguishable by spreading codes;
   providing one of the frequency channels for repeated frequency synchronization of the mobile stations in a downward direction;
   transmitting a chip sequence within one frequency channel;
   determining estimated values for the chip sequence from received signals by the mobile station to be synchronized;
   calculating a phase drift in the estimated values from at least a comparison of the estimated values with a reference chip sequence, which is identical to the transmitted chip sequence;
   determining a frequency offset from the phase drift; and
   using the frequency offset by the mobile station for frequency synchronization.

2. A method for frequency synchronization of a mobile station of a radio communications system as claimed in claim 1, wherein the step of transmitting a chip sequence further comprises simultaneously transmitting the chip sequence with information to be transmitted from at least one of user data connections and signaling connections.

3. A method for frequency. synchronization of a mobile station of a radio communications system as claimed in claim 1, wherein the step of transmitting a chip sequence further comprises obtaining at least two estimated values for calculating the phase drift.

4. A method for frequency synchronization of a mobile station of a radio communications system as claimed in claim 1, further comprising the step of:
   spreading the chip sequence with the aid of an individual spread code.

5. A method for frequency synchronization of a mobile station of a radio communications system as claimed in claim 1, wherein the phase drift is calculated as a proportionality factor in accordance with a method of least error squares from the comparison of the estimated values with the reference sequence.

6. A method for frequency synchronization of a mobile station of a radio communications system as claimed in claim 1, further comprising the step of:
   using at least part of the chip sequence for time synchronization and frequency synchronization.

7. A method for frequency synchronization of a mobile station of a radio communications system as claimed in claim 1, further comprising the step of:
   separating the signals in a frequency channel using a JD-CDMA method.

8. A method for frequency synchronization of a mobile station of a radio communications system as claimed in claim 1, further comprising the step of:
   selecting the frequency range with the frequency channel for frequency synchronization by the mobile station in accordance with a measurement of receiver power.

9. A mobile station of a radio communications system for use in connection with a method for frequency synchronization of the mobile station, wherein the radio communications system provides frequency channels which are formed both by time slots and by broadband frequency ranges and in which information from one or more connections is simultaneously transmitted between mobile stations and base stations, wherein information from different connections is distinguishable by spreading codes, wherein one of the frequency channels is provided for repeated frequency synchronization of the mobile stations in a downward direction, and wherein a chip sequence is transmitted within the one frequency channel, the mobile station comprising:
   a signal processing device for determining estimated values for the chip sequence from received signals, for comparing the estimated values with a reference chip sequence, which is identical to the transmitted chip sequence and for calculating a frequency offset from the comparison; and a control device for frequency synchronization which takes into account the frequency offset.

10. A base station for use in connection with a method for frequency synchronization of a mobile station of a radio communications system, wherein the radio communications system provides frequency channels which are formed both by time slots and by broadband frequency ranges and in which information from one or more connections is simultaneously transmitted between mobile stations and base stations, wherein the information from different connections is distinguishable by spreading codes, and wherein one of the frequency channels is provided for repeated frequency synchronization of the mobile stations in a downward direction, the base station comprising:

a signal generating device for generating a predetermined chip sequence; and a transmitting device for transmitting the chip sequence in the one frequency channel for frequency synchronization, wherein estimated values for the chip sequence are determined from received signals by the mobile station to be synchronized, a phase drift in the estimated values is calculated from at least a comparison of the estimated values with a reference chip sequence which is identical to the transmitted chip sequence, a frequency offset is determined from the phase drift, and the frequency offset is used by the mobile station for frequency synchronization.

* * * * *